UNITED STATES PATENT OFFICE.

HEATON PENNINGTON, OF CHICAGO, ILLINOIS.

PROCESS OF MAKING LEAD SULPHATE.

SPECIFICATION forming part of Letters Patent No. 452,386, dated May 19, 1891.

Application filed November 4, 1889. Serial No. 329,241. (No specimens.)

*To all whom it may concern:*

Be it known that I, HEATON PENNINGTON, a citizen of the United States of America, residing at Chicago, in the county of Cook and State of Illinois, have invented a certain new and useful Process for Manufacturing Sulphate of Lead, of which the following is a specification.

It is well known from laboratory experiments that by treating litharge or sugar of lead with dilute sulphuric acid and separating the sulphate from the liquid and washing it a pure lead sulphate is obtained; but the production of the litharge (by sublimation or otherwise) or the sugar of lead (by treating the lead with dilute acetic acid and evaporating the liquid) is so expensive as to practically prohibit the use of these processes at the present time in attempting to manufacture lead sulphate in commercial quantities for the purpose of a pigment.

The process heretofore industrially employed for producing lead sulphate from metallic lead is the old one described (but not claimed) in the patent of Freeman, dated December 27, 1887, No. 375,060, consisting in "submitting small feathers or flakes of metallic lead to the alternate action of dilute acetic acid and of atmospheric air, whereby a solution of lead acetate is produced, to which sulphuric acid is added to precipitate the lead as a sulphate;" but this old process as heretofore practiced has always produced a distinctly acicular crystalline sulphate, containing more or less lead oxide, lead acetate, and other impurities, either mechanically mixed with the sulphate or occluded within the crystals or aggregations of crystals, and therefore impossible to separate by any subsequent process. By reason of both of the contained impurities and the acicular crystallization, the resulting process, as correctly described in said Freeman's patent of October 16, 1883, No. 286,918, was "quite useless as a pigment, lacking density and opacity," and had to be subsequently mixed and ground with zinc-white, barytes, or other equivalent substances, to render it suitable for use as a paint, and the paint itself, when thus produced, was of inferior quality, liable, like the ordinary lead carbonate, to be attacked and discolored or corroded by atmospheric agencies that are entirely innocuous to a paint composed of pure amorphous sulphate and oil.

Having been personally engaged for a long time in manufacturing pigments by this process and realizing the unsatisfactory character of the results achieved by it I conceived the idea that possibly it might be so perfected or improved as to produce a pure substantially amorphous sulphate in condition to be used for paints without the admixture of anything but oil, and the entire process be thus materially cheapened by avoiding the necessity for using the comparatively expensive zinc-white, besides obtaining a better commercial article. My experiments to that end subsequently led me to the discovery that there were certain practical defects in the old and well-known methods of applying the process which caused the unsatisfactory results always theretofore experienced, and to the further discovery and invention of a practical means of eliminating all the difficulties and perfecting the result.

The invention will be best described by stating briefly the essential features of the old industrial process and of my improved process, pointing out their differences, and explaining the reasons therefor.

So far as I am aware the old process of reducing metallic lead to lead sulphate has always been carried out in the industrial arts as follows: Metallic lead is first reduced to flakes in contact with water, then separated from the water, piled in vats, and subjected to a bath of dilute acetic acid. The acetic solution is then drawn off and treated with commercial sulphuric acid to reduce the lead acetate to a sulphate precipitate, the liquid being gently stirred while chemical reactions are going on and care being taken that no excess of sulphuric acid be employed. During this time the mass of metallic lead remaining in the vat after the acetate solution is drawn off is allowed to stand unmoved, but exposed to the air, in order that it may be oxidized thereby. After the sulphate has formed and settled the acetate liquid is drawn off from the precipitate and replaced in the vat, fresh lead flakes being added to the mass of partially-reduced lead remaining therein. The process is then repeated indefinitely, and, as it is called, "continuously," the sulphate precipitate being from time to time collected and washed in about its own volume of water while gently stirred, and then removed, dried, ground, and mixed with the zinc-white or other substance or substances necessary to fit it for use with oil as a paint.

By my investigations, experiments, and discoveries I found this process to be radically defective in two essential particulars—viz., in the steps which precede the sulphuric-acid treatment it effected not only the formation of the necessary acetate, but also of a deleterious oxide or oxides, the exact chemical character of which I have not been able definitely to ascertain, but the presence of which I found to be absolutely fatal to any effort to procure by the subsequent treatment a pure amorphous lead sulphate; secondly, in the sulphuric-acid treatment the method pursued permitted the formation of large quantities of hard acicular crystals, which no subsequent grinding or trituration could render suitable for paints, and which, besides, occluded impurities and rendered it impossible to remove them by washing. I found by experiment that the deleterious oxides were mainly formed while the lead, after having been treated with acetic acid, was lying exposed to the action of the air in the vats. The acetic-acid treatment leaves a portion of the metallic lead broken down or reduced to small pieces and particles, which condense together, excluding the air both by their extensive surface contact with each other and by retaining in their interstices by capillary attraction considerable quantities of the liquid, and in practice this difficulty had always been aggravated by charging the fresh lead upon the old partially-reduced material, and thus further condensing and compacting it by the superincumbent weight. Having discovered the cause, I removed the difficulty by loosening up the mass of partially-reduced metallic lead whenever the acetate solution had sufficiently drained off and taking care that the fresh lead should not be charged upon it, and I regard it as an essential step of my improved process that the partially-reduced lead while subject to the action of the air should be kept thoroughly loosened up and permeable to the atmosphere throughout its mass, instead of being allowed to remain in a dense compacted condition, as heretofore, because unless this be done all further effort to produce pure amorphous sulphate may as well be abandoned. I also found that small quantities of the same deleterious oxides were liable to form on the metallic lead prior to its treatment with the acetic acid if preliminarily subjected to the action of water, as heretofore, and hence that it is better to charge the lead into the vats when it is freshly cut or flaked, without giving it any opportunity for surface oxidation either by contact with water or by any prolonged exposure to damp air. This precaution is not absolutely essential, because the quantity of deleterious oxide thus produced is generally so small that it may be disregarded if an absolutely perfect result is not required; but it is strongly recommended, because the presence of the impurity, even in minute quantities, unfavorably affects the subsequent steps of the process and the character of the product resulting therefrom. I further found that when the preliminary steps had been well taken, as above directed, the formation of acicular crystals of lead sulphate during the treatment of the acetate solution with sulphuric acid could be prevented by keeping the liquid in violent agitation until the chemical reaction had been completely effected. Heretofore it has been customary to use during this step the ordinary well-known mechanical agitator running at the rate of about ten revolutions per minute. At this speed, and even up to nearly twenty revolutions per minute, the process will be accompanied by the formation of the deleterious crystals, but at a speed of about twenty revolutions the acicular crystals do not appear and the resulting precipitate is practically amorphous and entirely suitable for paints without any grinding or crushing, except such as is necessary to break up the lumps, and without needing or being in any way improved by the addition of anything besides the oil. I therefore regard a violent agitation during the sulphuric-acid treatment as an essential feature of my improved process, and by the term "violent agitation" I mean an agitation so violent as to effectually prevent the formation of acicular crystals of lead sulphate in such size or quantity as to materially impair the product.

The improvements above described constitute the substance of my invention. The improved process in its entirety is preferably carried out in practice as follows: First, I take metallic lead and reduce it to thin sheets, shavings, shreds, filaments, or flakes by any suitable means and place it immediately in the vats without contact with water or long exposure to air. In thus reducing it I prefer to plane it into thin shavings or filaments, which curl up and intertangle or lodge across each other when aggregated together, forming ample air-spaces and materially tending to hinder it from subsequently settling into a compact mass. Substantially the entire surface of the lead becomes thus freshly cut and in the best condition to be vigorously attacked by the dilute acetic acid, which is applied as in the old process. I prefer to employ vats somewhat shallower and longer than those heretofore used, to give room for loosening up and shifting the position of the partially-reduced lead after the acetate solution has been formed and removed. The loosening up may be done in any suitable way, special attention being given to the finer and smaller pieces or particles, which tend to compact together, and which should be thoroughly stirred up, and, if possible, raised above the rest of the mass. In charging in fresh lead it should not be piled upon the partially-reduced mass, but placed in another part of the vat, and subsequently shifted over to make way for the next succeeding charge. The loosened-up lead will thus be kept on top of the mass, relieved from superincumbent weight, free to drain, and open to the air, and no deleterious reactions will take place under such conditions. Instead of placing the metallic lead on the bottom of the vats and shifting and loosening it up by hand after the acetate solution has been drawn off, as described, it may be placed in an ordinary tumbling-box during the process of aeration and kept loosened up by the motion of the box; or any other suitable means may be employed for keeping it in the loose permeable condition referred to during that stage of the process, the condition, and not the means for producing it, being the essential element. These requirements having been complied with, the acetate solution will pass over to the agitators and precipitating-vats in a proper condition for the successful application of the next step—the reduction of the acetate to a substantially amorphous sulphate. In this step the sulphuric acid is applied as in the old process, and the old well-known form of mechanical stirrer is preferably employed to agitate the liquid during the chemical reactions, but is speeded up to at least about twenty revolutions per minute, and if any other form of agitator be employed the violence of its action should at least be equal to that of the old agitator running at the speed indicated. In any case the line of demarcation is to be drawn at that degree of agitation below which acicular crystals are formed and at and above which a practically amorphous sulphate results, and can be readily ascertained by a microscopic examination of the precipitate. After the sulphate has formed it is separated from the liquid by settling in the usual way, or by a centrifugal extractor, the liquid returned to the vats which contain the metallic lead, and the sulphate precipitate thoroughly washed in pure water and then separated therefrom in the usual way. During this last operation it has been customary to use equal volumes of water and sulphate in an agitator running at ten revolutions per minute; but I find the product improved by using four or five, or more, volumes of water to one of sulphate and running the agitator at a higher speed, preferably twenty or more revolutions per minute. The sulphate is then dried and sufficiently ground or crushed to break up its lumps, and is ready for use with oil without the addition of any other substance. The resulting pigment is much superior in every way to the product of the old process, as well as to all lead-carbonate paints, and to all paints made from a chemically impure or distinctly crystalline lead sulphate, by whatever process produced, the amorphous character of the sulphate giving the paint exactly the density, opacity, body, and other qualities which best adapt it for practical application with a brush, and the purity of the sulphate rendering it unalterable by any ordinary atmospheric agencies except ammoniacal gas, which is present as a general rule only in stables and chemical manufactories. Of course any suitable drier may be used in preparing the paint, if preferred.

Having thus described my invention, what I claim as new, and desire to secure by Letters Patent, is—

The improved process of manufacturing lead sulphate directly from metallic lead, as hereinabove described, consisting, essentially, in the following steps, viz: first, reducing the metallic lead to thin sheets, shavings, shreds, filaments, or flakes, and subjecting it thus reduced to the alternate action of dilute acetic acid and of atmospheric air; secondly, draining and loosening up the mass of lead remaining in the vats after the acetate solution is drawn off for the further treatment; thirdly, mixing with the acetate solution thus drawn off a sufficient quantity of sulphuric acid to thoroughly reduce the lead acetate to a lead sulphate without leaving free sulphuric acid in the remaining liquid and subjecting the solution during this operation to an agitation sufficiently violent to prevent the formation of acicular crystals in the resulting precipitate and leave the sulphate practically amorphous; fourthly, separating the sulphate from the liquid and thoroughly washing it in pure water, and, fifthly, separating the sulphate from the water, drying, and crushing or grinding it for use, substantially as herein set forth.

HEATON PENNINGTON.

Witnesses:
M. E. DAYTON,
H. BITNER.